(12) United States Patent  
Terhaag

(10) Patent No.: US 8,284,437 B2  
(45) Date of Patent: Oct. 9, 2012

(54) MODIFYING A FOLD PROGRAM TO SATISFY CONFIGURATION CONDITIONS AND DISPLAYING THE MODIFIED FOLD PROGRAM

(75) Inventor: Michiel A. C. Terhaag, Melick (NL)

(73) Assignee: Oce-Technologies B.V., Venlo (NL)

( * ) Notice: Subject to any disclaimer, the term of this patent is extended or adjusted under 35 U.S.C. 154(b) by 1334 days.

(21) Appl. No.: 11/898,616

(22) Filed: Sep. 13, 2007

(65) Prior Publication Data

US 2008/0068621 A1 Mar. 20, 2008

(30) Foreign Application Priority Data

Sep. 15, 2006 (EP) .................................. 06120751

(51) Int. Cl.
*G06F 15/00* (2006.01)

(52) U.S. Cl. .................. 358/1.18; 493/405; 715/274

(58) Field of Classification Search .................. None
See application file for complete search history.

(56) References Cited

U.S. PATENT DOCUMENTS

| 5,905,935 | A | 5/1999 | Wakamatsu et al. |
| 6,104,470 | A | 8/2000 | Streefkerk et al. |
| 6,873,426 | B1* | 3/2005 | Farrell .................... 358/1.15 |
| 6,927,865 | B1 | 8/2005 | Kujirai et al. |
| 2004/0190065 | A1 | 9/2004 | Shimizu |
| 2007/0143671 | A1* | 6/2007 | Paterson et al. ........... 715/527 |

FOREIGN PATENT DOCUMENTS

EP 0889390 A1 1/1999

* cited by examiner

*Primary Examiner* — Stephen Hong  
*Assistant Examiner* — Asher Kells  
(74) *Attorney, Agent, or Firm* — Birch, Stewart, Kolasch & Birch, LLP

(57) ABSTRACT

A method selects a folding program for a job to be carried out on a folding system, the job being provided with a job specification. The method includes calculating a fold program and an associated fold configuration based on the job specification, resulting in a set of configuration properties. The method further includes evaluating the fold program to check whether the associated fold configuration properties satisfy a set of configuration conditions. A folding system for folding a job, a printer driver, a computer program and a computer-readable medium for carrying out the method are also included.

9 Claims, 5 Drawing Sheets

MODIFYING A FOLD PROGRAM TO SATISFY CONFIGURATION CONDITIONS AND DISPLAYING THE MODIFIED FOLD PROGRAM

CROSS-REFERENCE TO RELATED APPLICATIONS

This nonprovisional application claims priority under 35 U.S.C. §119(a) on Patent Application No. 06120751.0, filed in the European Patent Office on Sep. 15, 2006, the entirety of which is incorporated herein by reference.

BACKGROUND OF THE INVENTION

1. Field of the Invention

The present invention relates to a method for selecting a folding program for a job to be carried out on a folding system, the job being provided with a job specification. The method includes calculating a fold program and an associated fold configuration based on the job specification, resulting in a set of configuration properties.

2. Description of Background Art

A method of this kind is known from U.S. Pat. No. 6,104,470. The method constructs a graphical representation of a document to present a preview of a sheet or document via a display unit, in accordance with the actual selected document-finishing operations, prior to the execution thereof. By clicking on the graphical representation of the document in the preview window, the options of a specific finishing option can be manually modified. However, it is a disadvantage of this known method, that an operator has to evaluate whether the document will satisfy for his purpose, while the operator has to filter the information out of the visual representation and the plurality of defined options manually. This can be difficult if the document-finishing options get more comprehensive. A wrong interpretation of the preview can result in a folded package that does not satisfy the operator's demands. In particular, large printed documents that are folded in an unsatisfying fashion are very costly, because of the printing cost, the folding cost and the wasted time.

SUMMARY OF THE INVENTION

It is an object of the present invention to assist an operator with the evaluation of the consequences of a defined folding program prior to actual folding. To this end, a method for selecting a folding program comprises the step of evaluating the fold program to check whether the associated fold configuration properties satisfy a set of configuration conditions. By evaluating the calculated fold configuration properties prior to the actual folding of a document the chance of an unsatisfying result after printing, finishing and folding of a document reduces tremendously.

The job specification is the set of requirements of the operator. The job specification includes demands of the end-result of the folded package within the available options of the folding process. The fold program is the set of timed machine commands. The execution of the fold program on the folding system results in a folding configuration of the media. The folding configuration is the physical or virtual representation of the result of the folding program on the media that is to be folded with the folding system. The folding system includes a controller arrangement that is devised in order to have the folding system perform the method according to the present invention. Such a controller arrangement can be a single piece of hardware, such as an ASIC, but can also be devised as an arrangement being distributed over several components or even separate hardware devices, optionally partly or substantially completely constituted in software. It will be clear to one having ordinary skill in the art that the actual constitution of the controller arrangement is not essential for enabling the application of the present invention.

A folded medium includes a plurality of panels, which are folded around folding lines. In another embodiment of the method according to the present invention, at least one configuration condition is associated with one of the panel width and the legend position. If the fold configuration properties do not match the intentions of the operator or end-user of the folded package, the package will be rejected. Some of the reasons for rejection can be considered and/or determined in terms of panel width and legend position. By setting the right evaluation criteria the a priori evaluation of a folded package can be improved. Depending on the requirements of the operator or end-user, the position of the legend must be on the front panel of the package for efficient identifying and/or addressing of the package. Alternatively, the legend should be placed on the panel behind the front panel when the content of the legend contains confidential information, for example. A wrong placement of the legend on the folded package may decrease or even diminish the value of the folded package.

The dimensions of the compensation folds may be another criterion for the evaluation of a folded package. A package should in most cases be more or less homogeneous in its fold configuration, i.e. the width of the panels should be mainly uniform or at least evenly distributed over the package. An accumulation of small compensation folds near the end of a folded package does not contribute to an easy handling of the folded package and is in many cases an undesirable property.

The requirements of a particular folding method in combination with an additional folding requirement such as the last panel orientation may result in an undesirable fold configuration, which is very hard to detect in a simple preview method. An a priori evaluation of the properties of a folding configuration enables the folding system to assist an operator choosing a folding program. By evaluating the folding configuration, where at least one configuration condition is associated with one of panel width and legend position, the risk of unexpected and undesirable results after folding can be decreased.

In another embodiment of the method according to the present invention, the method further comprises the step of modifying the fold program of an associated fold configuration, having fold configuration properties that do not satisfy the set of configuration conditions, into a modified fold program such that the modified fold program and the associated modified fold configuration, having modified configuration properties, satisfy the set of configuration conditions. By modifying a previously determined fold program, which would result in an undesired folded package, an operator is assisted in choosing a folding program that will result in a satisfying folding result. In particular, in situations where the fold specifications get more comprehensive, the consequences of certain folding options is difficult to reckon with. An automatic modification of a folding program, which would deliver an unsatisfying result, increases the efficiency of the folding operators' work.

In another embodiment of the method according to the present invention, the method further comprises the step of displaying a visual representation of the calculated fold configuration via a display device. It is an asset for an operator to be able to predict the outcome of the folding process prior to the actual folding. A visual representation of the calculated fold configuration helps the operator with this prediction.

This visual representation may be two-dimensional or three-dimensional, and may include textual elements to clarify the properties of the fold configuration or fold program.

Alternatively, the visual representation of the fold configuration may be influenced by an interaction with the operator. An interactive visual representation of the fold configuration may increase the insight of the operator of the predicted outcome of the fold process. A three-dimensional interactive visual representation of the fold configuration enables the operator to review the predicted fold outcome prior to the folding process from more than one side of the package.

In a further embodiment of the method according to the present invention, the method further comprises the step of notifying an operator about the modifying step. If the evaluating step determines that the fold program will not result in a satisfying folded package, and the modifying step has been able to modify the folding program such that it will result in a satisfying folding result, the operator is notified about this modification. This notification may be implemented as a new visual representation via the display device, by means of different colors or icons, or other ways of signaling. Audiovisual signals may also be used to notify an operator about the outcome of the evaluating step, e.g. an audible alarm signal.

In a further embodiment of the method according to the present invention, the modified fold program in the modifying step is determined out of a set of alternative fold programs, which alternative fold programs are stored in a memory device. The modification of the fold programs, such that the associated fold configurations satisfy fold configuration criteria, should behave predictable for an operator.

If a fold program associated with a pre-programmed fold method is, e.g. based on a folding norm, but due to media dimensions or additional fold requirements is predicted to result in a non-satisfying fold result, the modification of the fold program is well programmable. These modifications are programmable in a computer readable memory device. The controller arrangement is able to compare the unsatisfying situation with a pre-programmed error situation and modify the fold program in the pre-programmed fashion. This database error mapping results in a predictable and robust behavior during the fold program selection, and contributes to a predictable end-result.

In a further embodiment of the method according to the present invention, the modified fold program is elected using a user interface. In some cases, the operator wants to execute the folding program, knowing that it will result in a folded package that does not satisfy the defined conditions. In other cases, there is more than one alternative possible to modify an unsatisfying folding program. In those cases, the operator wants to elect a modified or unmodified folding program out of the presented alternatives. The user interface is usable for this purpose. The operator may alternatively use the user interface to define that he wants the controller to modify without any operator interference or to not modify the specific job at all. This option enables the operator to define the priority of the modifications for each particular job.

In another embodiment of the method according to the present invention, the calculation step calculates the fold program and the associated fold configuration based on the actual capabilities of the folding system. As not all folding systems have the same capabilities at all times, the controller checks the actual capabilities of the folding system and uses the collected information in the calculating step. For example, if an operator chooses to use a certain folding method that prescribes a second fold, i.e. one or more folds perpendicular to a first direction of folding, while the folding system is not able to execute a second fold, because this is not supplied in the folding system or the second folding means are broken, the method can notify the operator about this fact and take this situation into account in calculating the predicted fold configuration. This contributes to an evaluation of the folding result prior to actual folding. The operator is therefore better informed about the folding process. Also, during a potential modification step by the method according to the present invention, the modification will be more detailed when the actual capabilities of the folding system can be taken into account. This increases the efficiency of the process of choosing a folding program.

In another aspect, the present invention relates to a folding system for folding a job, the job having a job specification, said folding system comprising a folding device that controllably folds the job, a controller that controls the folding device, a processor that calculates a fold program and an associated fold configuration based on the job specification, resulting in a set of configuration properties, and an evaluation device that is adapted to evaluate the fold program in operation to check whether the associated fold configuration properties satisfy a set of configuration conditions.

By evaluating the calculated fold configuration properties prior to the actual folding of a document, the chance of an unsatisfying result after printing, finishing and folding a document reduces.

In another embodiment according to the present invention, the folding system uses at least one condition that is associated with one of the panel width and the legend position in the evaluation device. If the fold configuration properties do not match the intentions of the operator or end-user of the folded package, the package will be rejected. Some of the reasons for rejection can be considered and/or determined in terms of panel width and legend position. By setting the right evaluation criteria, the a priori evaluation of a folded package can be improved. Depending on the requirements of the operator or end-user, the position of the legend must be on the front panel of the package for efficient identifying and/or addressing of the package. Alternatively, the legend should be placed on the panel behind the front panel when the content of the legend contains confidential information, for example. A wrong placement of the legend on the folded package may decrease or even diminish the value of the folded package.

The dimensions of the compensation folds may be another criterion for the evaluation of a folded package. A package should in most cases be more or less homogeneous in its fold configuration, i.e. the width of the panels should be mainly uniform or at least evenly distributed over the package. An accumulation of small compensation folds near the end of a folded package does not contribute to an easy handling of the folded package and is in many cases an undesirable property.

The requirements of a particular folding method in combination with an additional folding requirement such as the last panel orientation may result in an undesirable fold configuration, which is very hard to detect in a simple preview method. An a priori evaluation of the properties of a folding configuration enables the folding system to assist an operator in choosing a folding program. By evaluating the folding configuration, where at least one configuration condition is associated with one of panel width and legend position, the risk of unexpected and undesirable results after folding can be decreased.

In another aspect, the present invention relates to a printer driver for use in a workstation such as a PC for printing document files to a printer, comprising a data processing section for processing document data and submitting the processed document data to a printer system incorporating a folding system, and a graphical user interface section for communication with an operator by presenting information on the display screen of the workstation, said printer driver being laid out for implementing the method according to the present invention.

Folding systems are commonly coupled physically to printing systems such that the output of the printing system can selectably be the input for the folding system, and such that the printer output will be folded. An operator defines his requirements of the print job in the printer driver and can also define the folding options in the printer driver. The method according to the present invention assists the operator in choosing a folding program that will result in a satisfying folding result.

In another aspect, the present invention relates to a computer program embodied on a computer readable memory and comprising computer code implementing the method according to the present invention when executed in a computer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1A:
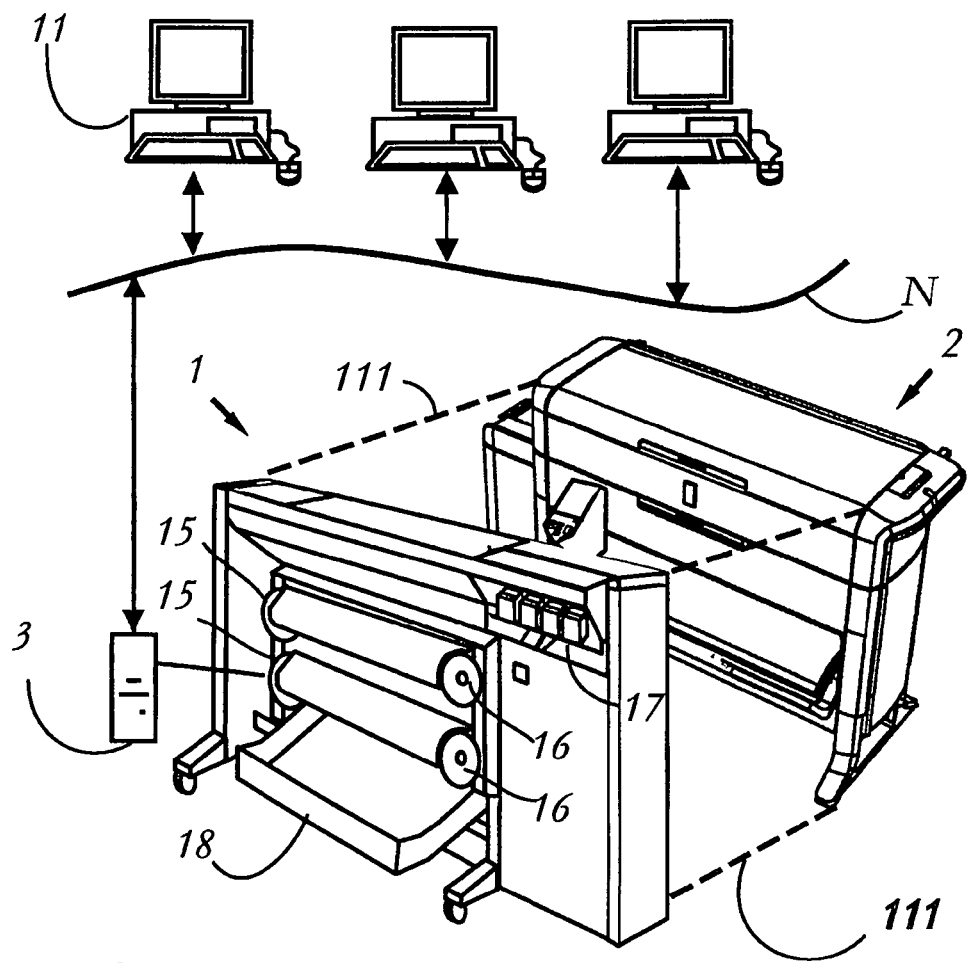
FIG. 1A is a schematic view showing a network connected to a plurality of workstations and a printing system, which is coupled to a folding system according to an embodiment of the present invention.

FIG. 1A shows a system of workstations 11, which is, via a network N, connected to a printing system 1 that is coupled to a folding system 2. On a workstation 11, a document is loaded and processed to be printed on the printing system 1. An operator uses an application on the workstation 11 to set the job specification of the print job. These settings may include print settings such as, e.g. paper size, media type, orientation and finishing settings. The finishing settings include settings for the folding system 2. The package of job settings and print data is sent to the print server 3. On the print server 3, this package is received and processed into the right form to be processed on the printing system 1. In order to be able to send a print file to a printing system 1, the workstation 11 must include a printer driver program. A printer driver program is logically coupled via the network N to one of the printing systems 1. When the operator has access to a plurality of printing systems 1, the workstation 11 contains a printer driver program for each one of them.

The printing system 1 is a wide format printer, comprising a print medium 15 on one or more spindles 16. This print medium 15 is fed into the print engine of the printing system 1 where a plurality of printheads, positioned on a carriage, scan over the print medium 15 in a direction extending mainly perpendicular to the medium feed direction. During a scanning movement over the print medium, the printheads jet small amounts of ink onto the print medium in a timed fashion. By a precise timing of the firing moments of the printheads, an image is printed on the print medium 15. The printheads are fed with ink, which is contained in several ink containers 17. Each container 17 contains a separate color of ink.

Depending on the job settings, a printed media 15 is fed to a post-processing station. If no further post-processing is needed, the printed media 15 is fed to a take-out tray 18 where the printed media are collected and an operator can take out the printed media 15. If the post-processing settings require the printed media 15 to be folded, the printed media will be fed into the folding system 2. The folding system 2 is then driven such that the printed media 15 is folded into the required form according to the instructed finishing options in the job settings. When all required post-processing actions are finished, the document is outputted to a take-out position. In practice, the folding system 2 is placed in direct physical contact with the printing system 1, such that the output of the printing system 1 can be selectably inputted into the folding system 2 if required. The media feed may be implemented automatically by an automatic feeding device such that media that is outputted by the printer is inputted into the folding system automatically. Alternatively, the media feed may be implemented such that an operator action is needed to feed the media into the folding system. The feed device is diagrammically depicted with the dashed lines 111 in FIG. 1A.

Figure 1B:
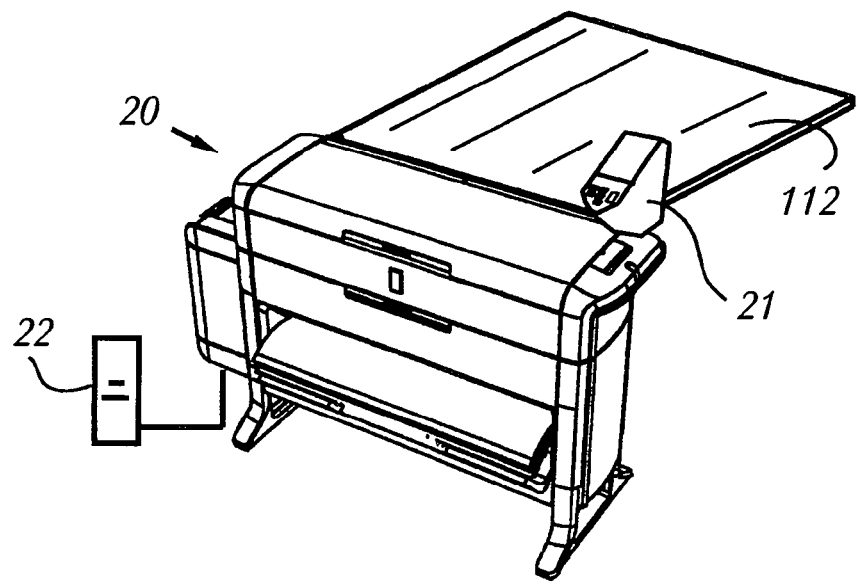
FIG. 1B shows a standalone implementation of a folding system according to an embodiment of the present invention.

FIG. 1B shows a standalone implementation of a folding system 20 in which a media can be fed and folded according to the settings that an operator has programmed on the local graphical user interface (GUI) 21 on the folding system 20 itself. An operator defines the folding job in terms of the folding method and folding options that are to be used. The folder controller 22 than calculates the fold program that has to be executed to fulfil the requirements of the folding job that has been formulated. The media input table 112 assists the operator by feeding the media into the folding system. After folding the media, the folded media may be transported to a take-out position where the folded media are gathered and can be taken out by the operator. The controller arrangement 22 can be a single piece of hardware, such as an ASIC, but can also be devised as an arrangement being distributed over several components or even separate hardware devices, optionally partly or substantially completely constituted in software. It will be clear to one having ordinary skill in the art that the actual constitution of the controller arrangement is not essential for enabling the application of the present invention.

Figure 2:
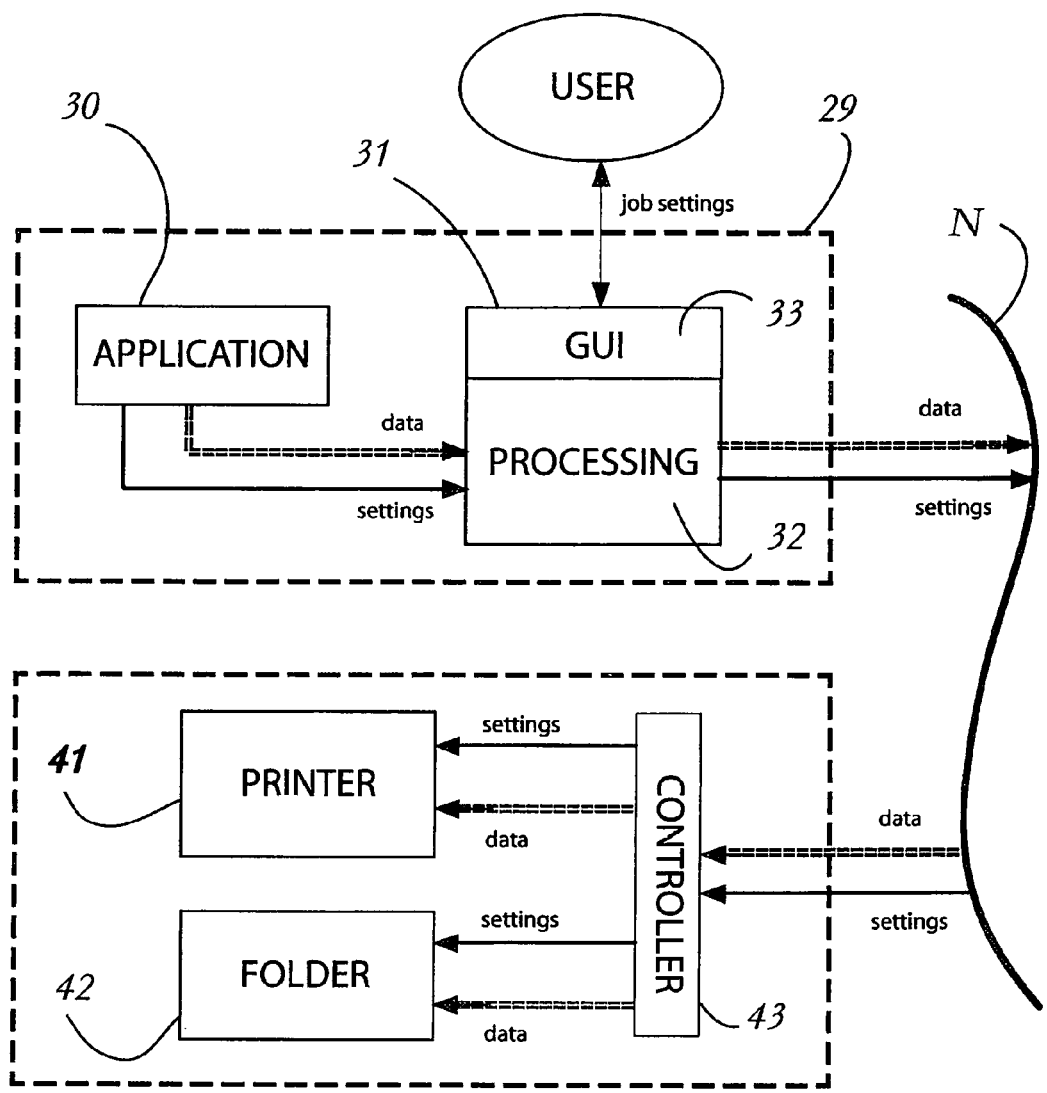
FIG. 2 shows a schematic functional view of a system of a user workstation, a printing system and a folding system according to an embodiment of the present invention.

FIG. 2 shows a schematic functional view of a system of a user workstation, a printing system and a folding system. The workstation includes an application program 30 for producing, editing or viewing files for printing, such as a document editor, a CAD drawing program or a graphics editor, and a printer driver program 31. When an operator wants to have a print job printed, the operator calls the printer driver 31, for example by clicking an icon intended therefor in the application window on a display screen. Alternatively, the printer driver program 31 may be called via the print service of the operating system. For instance, in the operating system MS Windows, the print service is activated via the "File menu" and a job specification window can be opened by clicking the "Properties window."

As shown schematically in FIG. 2, the printer driver program 31 includes a data processing portion 32 for reformatting the image data from the application program into a data format that is useable for the printing and folding systems (generally in a page description language such as Postscript) and for handling system management information, and a user interface portion 33 for interacting with an operator.

Upon activation, the printer driver user interface portion 33 opens a job specification window on the workstation display screen, into which the operator can input specifications for the print job. These specifications may include the number of copies, image size, paper type, several finishing options, and so on. The finishing options may include folding options, such as the folding norm that is required, the end-size of the folded package, the application of reinforcement elements at an edge of the folded package, and so on. The operator may select job settings or accept the preselected default settings. Some of the settings may already be selected by or with the application. Finally, the operator must activate a print button in the driver program window. In reaction, the printer driver program 31 renders the print data and sends the data together with the job settings to the printing 41 and folding system 42 via the network N to the printer and folder controller 43. The controller redistributes the required data and job settings to the printing and folding system, e.g. the printer 41 and folder 42. It will be clear that the workstation 29 may also be connected directly to the printing system. In that case the network N consists of a direct coupling from the workstation 29 to the controller 43. The options for the folding system 42 can be defined by freely instructing the required folding options or by selecting a predefined folding program. Such a folding program can be user-defined or programmed according to one of the existing folding norms, such as DIN, ANSI-US, JIS, Ericsson, Afnor, and so on. In general, these folding norms all prescribe certain properties of the folded package, such as the final panel width, a minimum panel width, width of a binding margin, the number of compensation panels, the orientation of the final panel, and so on. For example, the DIN-A norm prescribes that the front page and back page fully cover the package, and the final panel must be oriented to the left to enable a binding edge. The zigzag fold program is designed such that the left-hand edge of the bottom panel extends to the left of the pack. A compensating fold 51 in between is allowed. DIN-C prescribes that the front page covers the package while all panels have an equal width except from the last panel width, which equals the remaining length. In particular the choice of a folding norm in combination with an extra folding requirement such as "orientation of the final panel" may result in an undesired fold configuration, for example because of an extra compensation fold 51 or a compensation fold 51 that is too small.

Figure 3A:
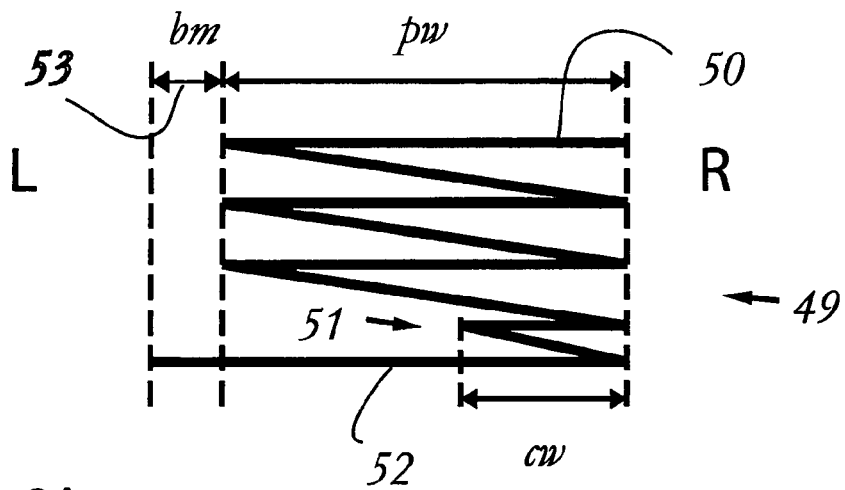
FIGS. 3A-3C schematically show fold configurations that are handled by a folding system according to an embodiment of the present invention.

FIG. 3A schematically shows a fold configuration according to the DIN-B folding norm, requiring a first panel 50 covering the package, a final panel 52 oriented to the left (marked with L) and a binding margin 53 at the final panel 52 having a predetermined width bm. Preferably, the package should not have more than 2 compensation panels 51. To comply with the requirement of the final panel orientation for binding purposes, the package comprises a single compensation fold 51 of acceptable width cw.

Figure 3B:
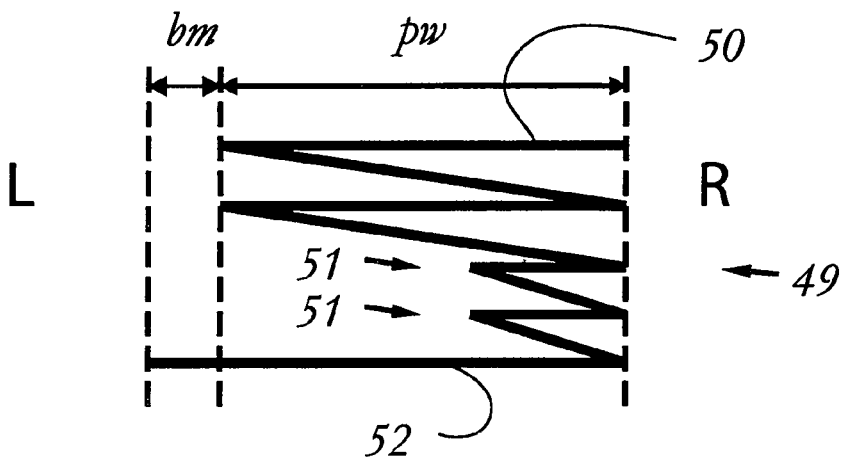

FIG. 3B schematically shows a fold configuration 49 having the same requirements as the fold configuration 49 of FIG. 3A but having a different media length. To comply with the requirement of the final panel orientation, two compensation folds 51 are necessary. Depending on the purpose of the folded package, this may not be a desirable fold configuration.

Figure 3C:
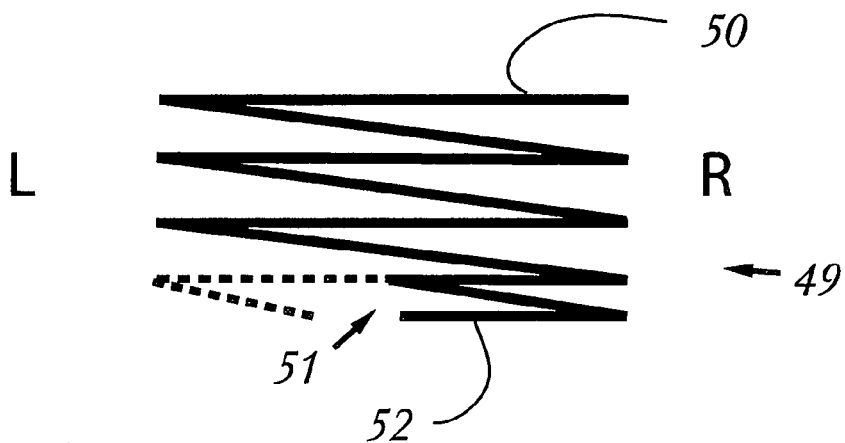

FIG. 3C schematically shows a fold configuration according to the DIN-C folding norm with the extra user-defined requirement that the final panel must have an orientation to the left side (marked with L). Usually the DIN-C folding norm results in a package wherein all panels have equal panel widths pw except for the final panel 52, which has the width of the remaining media length (as shown in FIG. 3C with a dotted line). To comply with the requirement of the final panel orientation, a compensation fold 51 is necessary (as shown in FIG. 3C with the solid line). Depending on the purpose of the folded packages the operator may choose to have the final panel oriented to the left as instructed, for example for purposes of uniformity in a collection of folded packages, but he also may prefer to have the neatness of a DIN-C folded package wherein the final panel is oriented to the right. The latter case would result in an undesired folded package.

The same considerations are true for the position of the legend. This position is prescribed in some folding norms, but may also be defined by an operator. Depending on the case and purpose of the folded package, an operator may want to choose for the folding configuration strictly according to the folding norm or according to an additionally defined position of the legend which may defer from the position that the folding norm prescribes.

Folded printed packages often represent a significant economic value. On the one hand, the printed media that are to be folded can be very large, and on the other hand, it may take a significant production time for both printing and folding. Therefore, a good prediction of the final result is very important for an operator. It can be difficult to see all the consequences of the chosen options for the operator, because an operator must define a lot of parameters prior to printing and folding a document. The present invention assists the operator enormously, by previewing the final result in a graphical user interface and identifying possible undesirable folding configurations.

Figure 4:
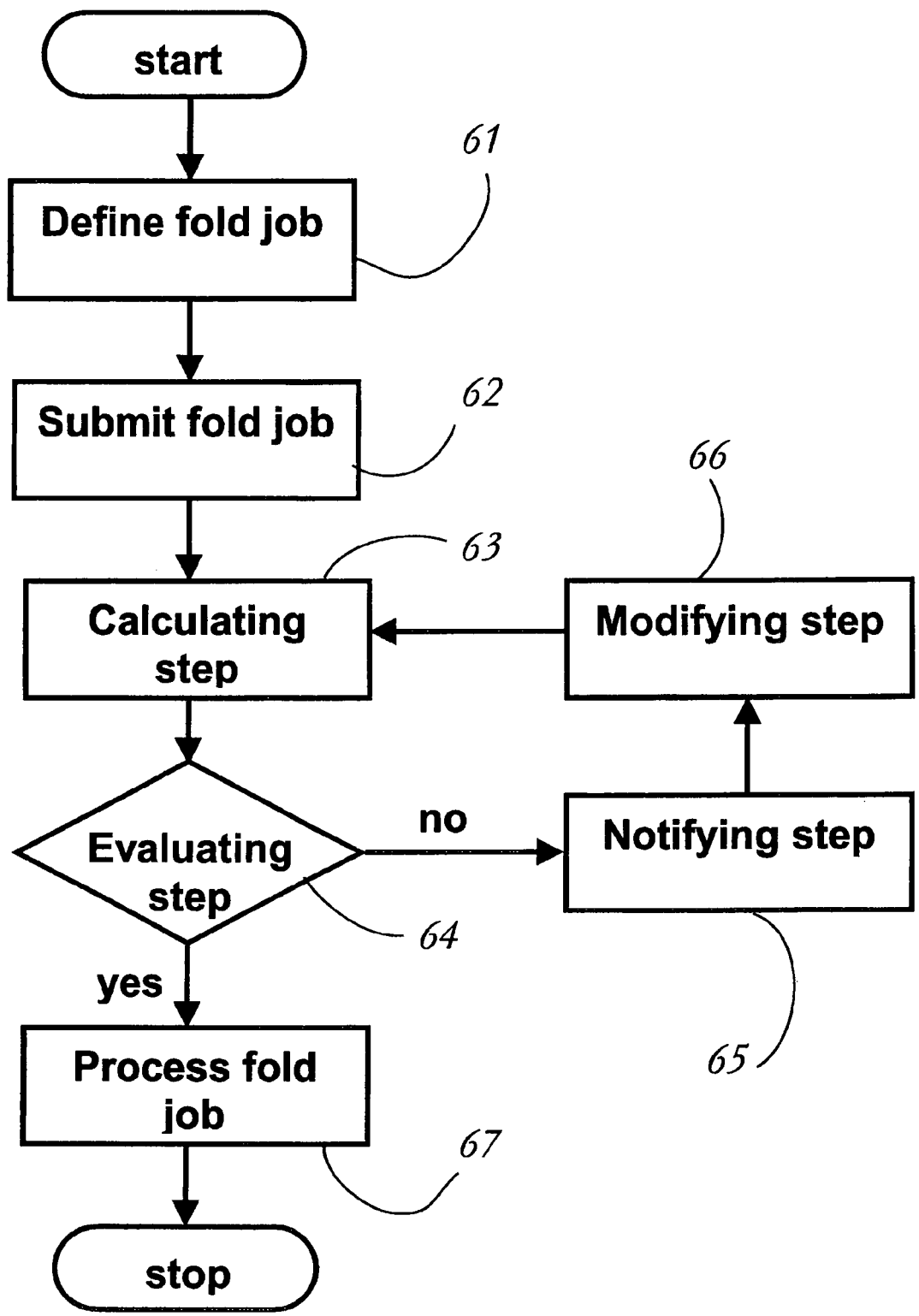
FIG. 4 schematically illustrates the process of selecting a folding program for a job that has to be carried out on a folding system according to an embodiment of the present invention.

FIG. 4 schematically illustrates the process of selecting a folding program for a job that has to be carried out on a folding system. The interaction between the folding system and the operator can be both in the printer driver program and at the graphical user interface of the printer and/or folding system.

At one moment during the definition of the print and folding job, the operator defines the folding requirements ("Define fold job") 61. Several folding options are chosen manually or set to the default value. When the operator has finished the job definition he submits the print job to the printing system and the folding job to the folding system ("Submit fold job") 62. The processor of the folding system now determines a fold program and an associated fold configuration based on the job specification ("Calculating step") 63. The fold program consists of a series of timed machine instructions for the folding system. The fold configuration is the geometric representation of the folded package in the case that the fold program has been or would be applied on the media by means of the folding system.

After determining the fold program and associated fold configuration, the processor evaluates the fold program to check whether the associated fold configuration results in a desirable folded package ("Evaluating step") 64. Based on one or more configuration conditions, the evaluating step identifies potential undesirable fold configurations. If the evaluating step determines that the fold configuration has no potential undesirable properties beforehand, it exits "yes" and processes the fold job as instructed ("Process fold job") 67. If it detects a potential undesirable fold configuration, such as illustrated in FIG. 3B or FIG. 3C, the evaluating step exists "no" and proceeds by notifying the operator or the folding system that a potential undesirable configuration has been detected ("Notifying step") 65. The situation is now presented in the printer driver program window or on the graphic user interface of the printer of folding system. The potential undesirable configuration may be identified by means of audio-visual signals such as a different color, encircling, a box, an alarm or the like. The processor now modifies the fold program that is associated with the undesirable fold configuration into a fold program that satisfies the set of configuration conditions ("Modifying step") 66. A visual representation of this modified fold configuration is then presented to the operator by means of the graphic user interface or the printer driver program. The operator can now choose to accept the modified fold program or to engage with the original fold program. The election of the fold program is executed by means of the graphic user interface or the printer driver program window.

Figure 5A:
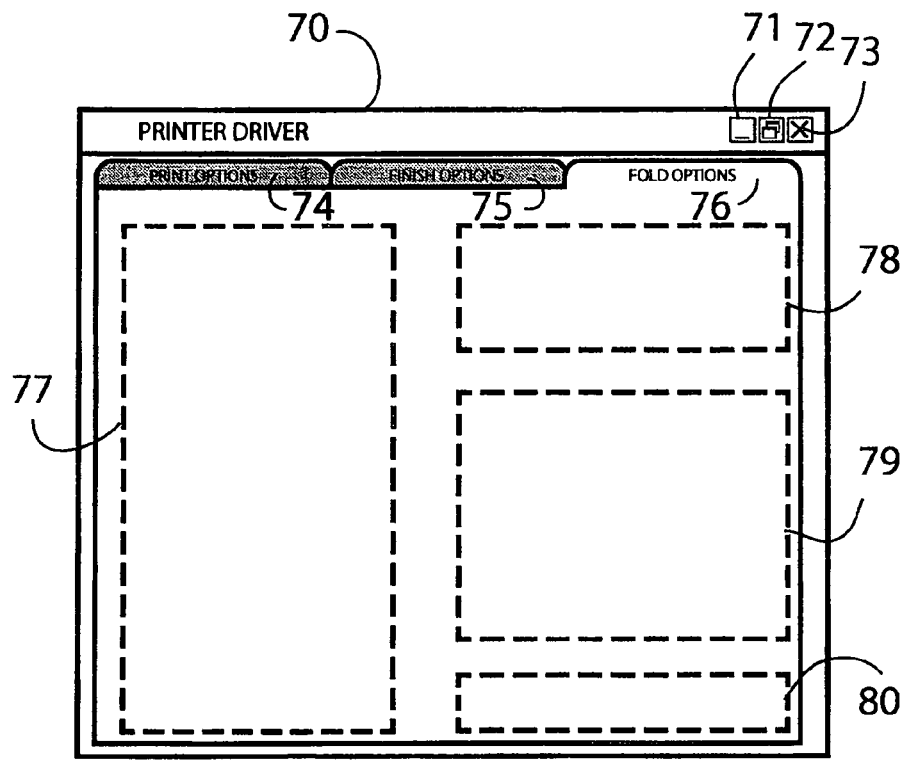
FIG. 5A schematically illustrates a printer driver user interface screen according to an embodiment of the present invention.

FIG. 5A schematically illustrates a general printer driver user interface screen according to an embodiment of the present invention. The printer driver program window 70 comprises buttons to minimize 71, maximize 72 and close 73 the application window 70. It further comprises a print options tab 74, in which the print options can be defined, a finish options tab 75, in which the finish options can be defined and a fold options tab 76. These tabs 74, 75, 76 can be activated by clicking with a pointing device, such as a mouse. The activated fold options tab 76 comprises several subsections 77, 78, 79, 80. The first subsection 77 is intended for defining general options, the second subsection 78 is intended for defining the folding method, the third subsection 79 is intended for a preview of the fold configuration, alerting and proposals for modified fold configurations, and the fourth subsection 80 is intended for confirming the settings.

Figure 5B:
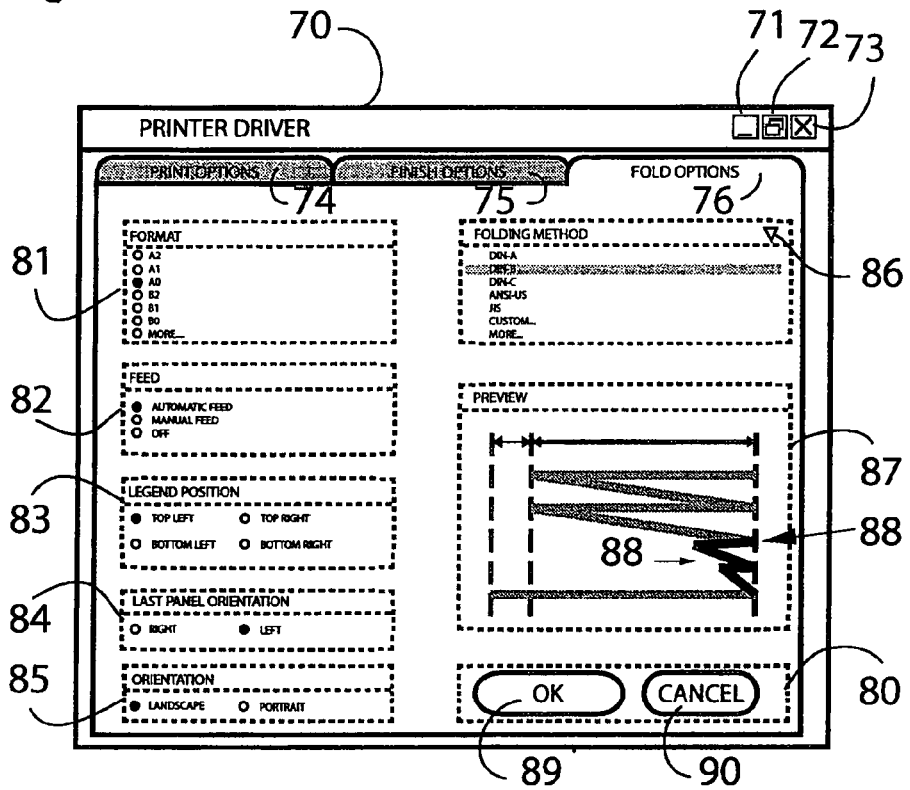
FIG. 5B schematically illustrates a printer driver user interface screen according to an embodiment of the present invention.

FIG. 5B schematically illustrates an embodiment of a printer driver user interface screen according to the present invention. The printer driver program window 70 has the general layout as described in FIG. 5A. The first subsection comprises a format field 81. In this format field 81, the dimensions of the media can be defined. This can be defined manually, it can be measured a priori, or it can be posted from another section of the printer driver, such as the print options tab 74, in which the print dimensions are set.

The first subsection further comprises a feed field 82. This field defines the method of insertion of the media. This can be automatically, i.e. directly from the printing system into the folding system, manually, or off.

It further comprises a legend position field 83. This field defines the position of the legend. Some folding norms prescribe the position of the legend on the final folded package. This position can be defined manually in this field, posted from another part of the printer driver, e.g. a part that can interpret the printed document, or can be detected automatically via an optical legend detection device.

A folding system for folding a job may comprise an optical detection device that detects legend properties such as the position and orientation of the legend. A folding system may adapt its folding program accordingly using this knowledge, such that the position of the legend appears in the folded package as desired by an operator.

The last panel orientation field 84 defines the orientation of the last panel. This option is important if the folded package needs to be perforated for archiving and some folding norms prescribe the last panel orientation.

The orientation field 85 defines the orientation of the legend and/or the document. This can be landscape or portrait, depending on the orientation of the long side of the document or legend.

The second subsection 78 defines the folding method. This is a dropdown menu 86. If the operator activates this dropdown menu 86, a menu drops down in which the required folding method can be defined. By moving the pointing device over the menu items, the individual options are highlighted. Activating an item by clicking selects a single item. FIG. 5B shows the selection of the DIN-B folding method.

The third subsection 79 presents a visual representation 88 of the calculated fold configuration based on all or some of the defined options and properties of the document. The result of the evaluating step of the method according to the present invention is visually represented in this window 87, by means of an alerting signal, implemented as a different color of the visual representation 88 of the fold configuration. The extra compensation fold 51 is a potential undesired fold configuration property. An operator can activate the preview by clicking with the mouse pointer on the preview window 87 and a modified fold configuration is presented (not shown in FIG. 5B).

The fourth subsection presents a confirmation button 89 "Ok" and a cancel button 90 "Cancel." Pressing the confirmation button 89 submits the options to the printing and folding system.

It will be clear that the setting of options as presented in the printer driver program window in FIG. 5A and FIG. 5B may also be located on the graphic user interface of the printing and/or folding system.

The modification of the calculated folding program may be implemented in several algorithms, such as e.g. a logical check of conditions against the calculated properties of the fold configuration, a database based check of the geometric properties of the fold configuration or a learning algorithm that will be trained in modifying the fold configuration according to the requirements of the operator, for example by means of a neural network.

It will be clear for one having ordinary skill in the art that the folding system may be operated in combination with any type of marking method. A printing system may be used based on any one of, e.g. inkjet, toner, hot melt or UV-curable ink technology.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for selecting a folding program for a job to be carried out on a folding system, the job being provided with a job specification, said method comprising the steps of:
   calculating a fold program and an associated fold configuration based on the job specification, resulting in a set of configuration properties;

evaluating the fold program to check whether the associated fold configuration properties satisfy a set of configuration conditions;
associating at least one configuration condition with one of a panel width and a legend position;
modifying the fold program of an associated fold configuration, having fold configuration properties which do not satisfy the set of configuration conditions, into a modified fold program such that the modified fold program and the associated modified fold configuration, having modified configuration properties, satisfy the set of configuration conditions; and
displaying a visual representation of the calculated fold configuration via a display device.

2. The method according to claim 1, further comprising the step of notifying an operator about the modifying step.

3. The method according to claim 2, further comprising the step of executing the notifying step via the display device.

4. The method according to claim 1, further comprising the step of determining the modified fold program in the modifying step out of a set of alternative fold programs that are stored in a memory device.

5. The method according to claim 1, further comprising the step of electing the modified fold program using a user interface.

6. The method according to claim 1, the step of calculating further comprises the step of calculating the fold program and the associated fold configuration based on the actual capabilities of the folding system.

7. A folding system for folding a job, the job having a job specification, said folding system comprising:
   a folding device configured to controllably fold the job;
   a controller configured to control the folding device;
   a processor configured to calculate a fold program and an associated fold configuration based on the job specification, resulting in a set of configuration properties;
   an evaluation device that is adapted to evaluate the fold program in operation to check whether the associated fold configuration properties satisfy a set of configuration conditions an association device configured to associate at least one configuration condition with one of a panel width and a legend position;
   a modifying device configured to modify the fold program of an associated fold configuration, having fold configuration properties which do not satisfy the set of configuration conditions, into a modified fold program such that the modified fold program and the associated modified fold configuration, having modified configuration properties, satisfy the set of configuration conditions; and
   a display device configured to display a visual representation of the calculated fold configuration.

8. A printer driver for use in a workstation for printing document files to a printer, comprising:
   a data processing section that processes document data and submits the processed document data to a printer system incorporating a folding system; and
   a graphical user interface section that communicates with an operator by presenting information on the display screen of the workstation,
   said printer driver being laid out for implementing a method for selecting a folding program for a job to be carried out on a folding system, the job being provided with a job specification, said method comprising the steps of:
      calculating a fold program and an associated fold configuration based on the job specification, resulting in a set of configuration properties;
      evaluating the fold program to check whether the associated fold configuration properties satisfy a set of configuration conditions;
      associating at least one configuration condition with one of a panel width and a legend position;
      modifying the fold program of an associated fold configuration, having fold configuration properties which do not satisfy the set of configuration conditions, into a modified fold program such that the modified fold program and the associated modified fold configuration, having modified configuration properties, satisfy the set of configuration conditions; and
      displaying a visual representation of the calculated fold configuration via a display device.

9. A computer program embodied on a non-transitory computer readable medium, comprising computer code for implementing a method for selecting a folding program for a job to be carded out on a folding system when executed in a computer, the job being provided with a job specification, said method comprising the steps of:
   calculating a fold program and an associated fold configuration based on the job specification, resulting in a set of configuration properties;
   evaluating the fold program to check whether the associated fold configuration properties satisfy a set of configuration conditions;
   associating at least one configuration condition with one of a panel width and a legend position;
   modifying the fold program of an associated fold configuration, having fold configuration properties which do not satisfy the set of configuration conditions, into a modified fold program such that the modified fold program and the associated modified fold configuration, having modified configuration properties, satisfy the set of configuration conditions; and
   displaying a visual representation of the calculated fold configuration via a display device.

* * * * *